(12) United States Patent  
Norp et al.

(10) Patent No.: US 9,913,308 B2  
(45) Date of Patent: Mar. 6, 2018

(54) DEVICE-TO-DEVICE DISCOVERY AND CONTROL IN A WIDE AREA NETWORK

(71) Applicants: Koninklijke KPN N.V., The Hague (NL); Nederlandse Organisatie voor Toegepast-Natuurwetenschappelijk Onderzoek TNO, s-Gravenhage (NL)

(72) Inventors: Antonius Norp, The Hague (NL); Bernardus Hillen, Zoetermeer (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/031,980

(22) PCT Filed: Oct. 28, 2014

(86) PCT No.: PCT/EP2014/073099  
§ 371 (c)(1),  
(2) Date: Apr. 25, 2016

(87) PCT Pub. No.: WO2015/063075  
PCT Pub. Date: May 7, 2015

(65) Prior Publication Data  
US 2016/0278148 A1 Sep. 22, 2016

(30) Foreign Application Priority Data  
Oct. 28, 2013 (EP) .................................. 13190515

(51) Int. Cl.  
*H04W 24/00* (2009.01)  
*H04W 76/02* (2009.01)  
(Continued)

(52) U.S. Cl.  
CPC ......... *H04W 76/023* (2013.01); *H04W 8/005* (2013.01); *H04W 64/006* (2013.01)

(58) Field of Classification Search  
CPC .. H04W 76/023; H04W 64/006; H04W 8/005  
See application file for complete search history.

(56) References Cited

U.S. PATENT DOCUMENTS

| | | | |
|---|---|---|---|
| 2004/0162871 A1 | 8/2004 | Pabla et al. | |
| 2005/0099982 A1 | 5/2005 | Sohn et al. | |

(Continued)

FOREIGN PATENT DOCUMENTS

| | | |
|---|---|---|
| EP | 1 253 766 A2 | 10/2002 |
| EP | 1 253 766 A3 | 9/2003 |

(Continued)

OTHER PUBLICATIONS

European Search Report, European Patent Application No. 13190515.0, dated Sep. 22, 2014.

(Continued)

*Primary Examiner* — Ajit Patel  
(74) *Attorney, Agent, or Firm* — McDonnell Boehnen Hulbert & Berghoff LLP

(57) ABSTRACT

The disclosure relates to a method for discovery of one or more devices of a group of devices to establish a direct connection between at least two devices of the group of devices over a wide area network. The wide area network contains or is connected to a discovery server system. The discovery server system is configured for identifying a group associated with the group of devices, wherein each of the devices has a corresponding device identifier associated with the group. A discovery message from a first device of the group of devices is received, the discovery message comprising a device identifier associated with the first device. The group associated with the group of devices is deter- (Continued)

mined on the basis of the received device identifier of the first device. The corresponding device identifier of one or more devices of the group of devices is determined on the basis of the determined group, and discovery information is transmitted only to one or more devices of the group of devices.

22 Claims, 7 Drawing Sheets

(51) Int. Cl.
*H04W 8/00* (2009.01)
*H04W 64/00* (2009.01)

(56) References Cited

U.S. PATENT DOCUMENTS

| | | | |
|---|---|---|---|
| 2007/0280230 A1 | 12/2007 | Park | |
| 2009/0094317 A1 | 4/2009 | Venkitaraman | |
| 2009/0285119 A1 | 11/2009 | Horn et al. | |
| 2009/0327391 A1* | 12/2009 | Park | H04W 8/005 709/201 |
| 2011/0153865 A1* | 6/2011 | Hong | H04L 45/02 709/243 |
| 2011/0294474 A1 | 12/2011 | Barany et al. | |
| 2012/0059932 A1 | 3/2012 | Messer et al. | |
| 2012/0151006 A1 | 6/2012 | McInerney et al. | |
| 2012/0166584 A1 | 6/2012 | Kwon et al. | |
| 2012/0324567 A1 | 12/2012 | Couto et al. | |
| 2013/0288668 A1* | 10/2013 | Pragada | H04W 12/06 455/426.1 |
| 2014/0029596 A1* | 1/2014 | Li | H04W 8/005 370/338 |
| 2014/0056220 A1* | 2/2014 | Poitau | H04W 40/246 370/328 |
| 2014/0094212 A1* | 4/2014 | Ahn | H04W 48/16 455/517 |
| 2014/0153489 A1* | 6/2014 | Perras | H04W 60/00 370/328 |
| 2014/0219261 A1* | 8/2014 | Johnsson | H04W 76/023 370/338 |
| 2015/0208453 A1* | 7/2015 | Yamazaki | H04W 8/005 370/329 |
| 2015/0327046 A1* | 11/2015 | Lee | H04W 56/002 370/338 |

FOREIGN PATENT DOCUMENTS

| | | |
|---|---|---|
| GB | 2445791 A | 7/2008 |
| GB | 2499411 A | 8/2013 |
| WO | 2006/071468 A2 | 7/2006 |
| WO | 2006/115862 A1 | 11/2006 |
| WO | 2007/063408 A2 | 6/2007 |
| WO | 2009/037665 A2 | 3/2009 |
| WO | 2010/144889 A1 | 12/2010 |
| WO | 2011/130623 A2 | 10/2011 |
| WO | 2011/130623 A3 | 10/2011 |

OTHER PUBLICATIONS

Helal, S., "Standards for Service Discovery and Delivery", IEEE Pervasive computing, IEEE Service Center, Los Alamitos, CA, vol. 1, No. 3, Jan. 1, 2002, pp. 95-100.

Partial European Search Report, European Patent Application No. 13190515.0, dated May 21, 2014.

PCT Search Report and Written Opinion, PCT International Application No. PCT/EP2014/073099, dated Jan. 26, 2015.

"3rd Generation Partnership Project: Technical Specification Group Services and System Aspects: General Packet Radio Service (GPRS) Enhancements for Evolved Universal Terrestrial Radio Access Network (E-UTRAN) Access (Release 10)", 3GPP TS 23.401 V10.1.0, Sep. 2010, pp. 1-271.

Moats, R., "URN Syntax", Network Working Group, Request for Comments 2141, May 1997, 6 pages.

\* cited by examiner

DEVICE-TO-DEVICE DISCOVERY AND CONTROL IN A WIDE AREA NETWORK

CROSS REFERENCE TO RELATED APPLICATIONS

The present application is a national stage entry of, and claims priority to, PCT/EP2014/073099, filed on Oct. 28, 2014, which claims priority to European Patent Application EP 13190515.0, filed in the European Patent Office on Oct. 28, 2013, both of which are hereby incorporated in their entirety herein by reference.

FIELD OF THE INVENTION

The invention relates to a method, a discovery server system and telecommunications system for device-to device discovery and control in a wide area network. In particular, the invention relates to a method and network for discovery of one or more devices of a group of devices to establish a direct connection between at least two devices of the group of devices over a wide area network.

BACKGROUND

Device-to device communication of mobile user devices is a relatively new field of interest. One protocol for enabling device-to-device communication is Universal Plug and Play (UPnP™) UPnP technology defines an architecture for pervasive peer-to-peer network connectivity of intelligent appliances, wireless devices, and PCs. It is designed to bring easy-to-use, flexible, standards-based connectivity to ad-hoc or unmanaged networks.

In a local area network (LAN) the UPnP protocol enables communication between services and control points which reside on different (physical and logical UPnP) devices. Controlled devices are devices that offer one or more services. A control point (CP) is an application that is able to control a service. Both control points and controlled devices can be implemented on a variety of platforms including personal computers and embedded systems.

When a device is started up, it advertises its presence by broadcasting in the LAN using a specific multicast address, e.g. 239.255.255.20:1900. CPs in the LAN listen to the specific multicast address and detect the presence (advertising) of devices and services running on those devices. A CP can also give a search (searching) request using a filter and get answer of requested devices. Advertising and searching are both referred to as discovery. The fundamental exchange in both cases is a discovery message containing discovery information, i.e. a few essential specifics about the device or one of its services, e.g., its type, identifier, and a pointer to more detailed information.

The CP can interact (based on unicast) with the found device and acquire a list of available services. After selecting a specific service the CP gets a list of available functions. Interaction about services and functions is standardized in the form of XML files that also contain commands for controlling the service and offering subscription for service event messages.

In general, mobile devices are not connected in a LAN, but connected (via tunneling) and a Packet Gateway (P-GW) to either the Internet or an operator wide IP addressing domain. Now the problem is how to enable specific mobile devices for discovery, control and event messaging in a flexible way as in a LAN.

Furthermore, in a LAN, discovery is carried out by means of messages to a UPnP standardized multicast address. For device-to-device communication between mobile devices sending multicast messages over the whole Internet or the operator wide IP addressing domain will not work because of the uncontrolled spread of these messages. A reduction of the number of allowed hops in the network may mitigate this problem to some extent but is counterproductive for the range wherein devices can communicate using UPnP.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The present disclosure presents a method for device-to-device discovery over a wide area network (WAN).

It will be appreciated that devices may comprise any devices connectable to a network, e.g. phones, tablets, game consoles, cameras, navigations systems, medical devices, watches, eye-glasses comprising cameras, electronic displays, printers, scanners, any household appliances, office equipment, machines etc.

In one aspect of the disclosure, a method for discovery of one or more devices of a group of devices to establish a direct connection between at least two devices of the group of devices over a wide area network is disclosed. The wide area network contains or is connected to a discovery server system.

The discovery server system facilitates discovery (advertising and/or searching) of two devices over the WAN. In order to do so, the discovery server system is configured for determining a group associated with the group of devices. Each of the devices has a corresponding device identifier associated with the group.

A discovery message from a first device of the group of devices is received by the discovery server system. The discovery message comprises a device identifier associated with the first device. The group associated with the group of devices is determined (e.g. retrieved or looked up) on the basis of the received device identifier of the first device. The device identifiers of one or more devices of the group of devices are then determined on the basis of the determined group. Discovery information, i.e. a few essential specifics about the device or one of its services (e.g., its type, identifier, and a pointer to more detailed information) is transmitted from the discovery server system only to one or more devices of the group of devices.

In another aspect of the disclosure, a discovery server system for enabling discovery of one or more devices of a group of devices to establish a direct connection between at least two devices of the group of devices over a wide area network is provided. The discovery server system is configured to be contained in or connected to the WAN.

The discovery server system is further configured for receiving a discovery message from a first device of the group of devices. The discovery message comprises a device identifier associated with the first device. The discovery server system is configured for determining a group associated with the group of devices, wherein each of the devices has a corresponding device identifier associated with the group, on the basis of the received device identifier of the first device. The discovery server system is further configured for determining the corresponding device identifiers of the one or more devices of the group of devices on the basis of the determined group. The discovery server system is configured for transmitting the discovery information only to one or more devices of the group of devices.

In a further aspect of the disclosure, a telecommunications network configured for delivering the discovery message of the first device to the discovery server system is presented.

The implementation of the discovery server system provides for a means to ascertain for a wide area network to which group of devices a discovery message is related and, as a consequence, to determine which information should be transmitted to only which devices. The uncontrolled distribution of discovery information within the wide area network is omitted in this manner. In one embodiment, the control protocol comprising the discovery may comprise UPnP.

It should be appreciated that devices may be members of more than one group.

It should also be appreciated that control protocols other than UPnP may be used and/or adapted according to the method, discovery server system and telecommunications system of the present application, e.g. Bonjour™/AirPlay™.

Several embodiments have been envisaged for the determination of groups.

One embodiment involves the use of a group identifier, i.e. an identifier common to all devices in the group. The group identifier may be determined at the discovery server system from the device identifier associated with the discovery message of the first device. In such an embodiment, the discovery server system has access to a group identifier associated with the group of devices. Each of the devices has a corresponding device identifier associated with the group identifier.

A discovery message from a first device of the group of devices is received by the discovery server system. The discovery message comprises a device identifier associated with the first device. The group identifier associated with the group of devices is determined (e.g. retrieved or looked up) on the basis of the received device identifier of the first device. The device identifiers of one or more devices of the group of devices are then determined on the basis of the determined group identifier.

Instead of using explicit group identifiers, implicit information may be used to determine groups of devices at the discovery server system. For example, different groups of devices may be stored on different corresponding lists containing the members of the group. Another example includes the embodiment wherein a portion of the device identifier contains information of the group to which the device associated with the device identifier belongs.

In a disclosed embodiment, the discovery message from the first device contains discovery information. The discovery information is transmitted only to each of the one or more devices of the group of devices for which a corresponding device identifiers has been determined. In this manner, the device can advertise its presence over a WAN.

In another disclosed embodiment, the discovery information is received and stored from one or more devices in association with the device identifiers of the one or more devices of the group of devices. The stored discovery information associated with the device identifiers of the one or more devices of the group of devices is determined on the basis of the device identifier of the first device. The determined discovery information of the one or more devices is transmitted only to the first device. This embodiment enables control points to search for devices offering services. In this embodiment, the discovery server system may run a control point application.

In yet a further embodiment, a unique destination address may be determined for each of the one or more devices associated with the determined corresponding device identifiers. The discovery information is transmitted only to the one or more devices using the determined one or more corresponding destination addresses. Determination and use of a device-specific address instead of the common UPnP multicast address avoids that all UPnP device (within and outside the group) are bothered by discovery messages of a device within a specific group.

The devices may have IP addresses. IP addresses may be allocated dynamically (e.g. because of shortage of IP addresses) or permanently to devices. In the former case, a refresh of the address of a device is advantageously registered by the discovery server system. In such an embodiment, an address notification message may be received from a device of the group of devices containing the corresponding device identifier of the device. The address of the device from which the address notification message has been received may then be determined and stored as the destination address of the device corresponding to the device identifier.

In one disclosed embodiment, some devices of the group of devices may be associated with a different operator, e.g. because of different subscriptions. Accordingly, at least one device of the group of devices may have a destination address in an operator domain different from the operator domain of the first device. It has been envisaged that at least a portion of the device identifier is indicative of the different operator domain of the at least one device. Whereas the group determination step may still be performed in the operator domain of the operator of the first device, the actual determination of the destination address may be performed in a server associated with the other operator domain and the discovery information for the device with a server associated with the operator domain indicated by the portion of the device identifier may be exchanged with this server.

Devices may not always be available for providing services or as control points. A termination notification message may be received by the discovery server system (either generated by the device or within the network after detecting some event, such as detach) and the discovery system may update the group information accordingly. For example, the discovery server system may remove the device identifier from the group or the device identifier may be given a "non-available" status. The discovery information is then no longer transmitted to the device associated with the device identifier contained in the termination notification message.

In one embodiment, the device identifiers corresponding with each of the devices may comprise a UPnP UUID or an IMSI. The device identifier is preferably tied to a mobile subscription. The device identifier may be either provisioned from the network or be stored in the device and transmitted to the telecommunication network with the discovery message. The device identifier may be a non-public identifier to avoid that identifiers can be abused and devices can illegally be made part of a group.

Another aspect of the present disclosure relates to a telecommunications network configured for delivering the afore-mentioned discovery message of the first device to the discovery server system. UPnP was originally used only within a local area network and discovery messages were sent using multicasting to all devices in the LAN, since all these devices were automatically considered to be part of the group. Whereas this may be effective in a LAN, it has been envisaged that such an approach cannot be expanded to a WAN, because this would result in an enormous amount of multicast messages and may raise privacy concerns. Therefore, the telecommunications network needs to be configured such that the discovery message is received only by the discovery server system in case the discovery message is transmitted using a multicast address, such as a standardized UPnP multicast address. The discovery message may also be such that no measures have to be taken in the telecommunications network, e.g. by using the IP address of the discovery server system.

In one embodiment, the telecommunications network comprises a network entity (e.g. a P-GW) for use in combination with the discovery server system. The network entity comprises a receiver configured for receiving the discovery message from the first device, the discovery message being addressed to a multicast address and a computer means comprising computer circuitry programmed for directing the discovery message only to the discovery server system. For example, the discovery message may be received in relation to a particular Application Point Name (APN) and the network entity has a dedicated interface, associated with the APN, for transmitting the discovery message to the discovery server system. In another example, the network entity is configured for replacing the multicast address with a unicast address of the discovery server system.

The device identifiers corresponding to the devices of the group of devices may be assigned to the devices in various manners. In one embodiment, the device identifier may be stored in the device, e.g. on a SIM or USIM card. The device identifier may then be included in the discovery message. The network, however, may also play a part in having a device identifier correspond to a device. In one embodiment, the device identifier is transmitted to the first device from the network for inclusion in the discovery message. When a device registers for the first time to the mobile network, the telecommunications network can provide all kinds of data parameters related to the subscription and may thus include an identifier for the discovery message. In another embodiment, the network itself may include the device identifier in the discovery message. The network may perform network assertion, i.e. the network (entity) blocks incorrect device identifiers and replace these with correct identifiers.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
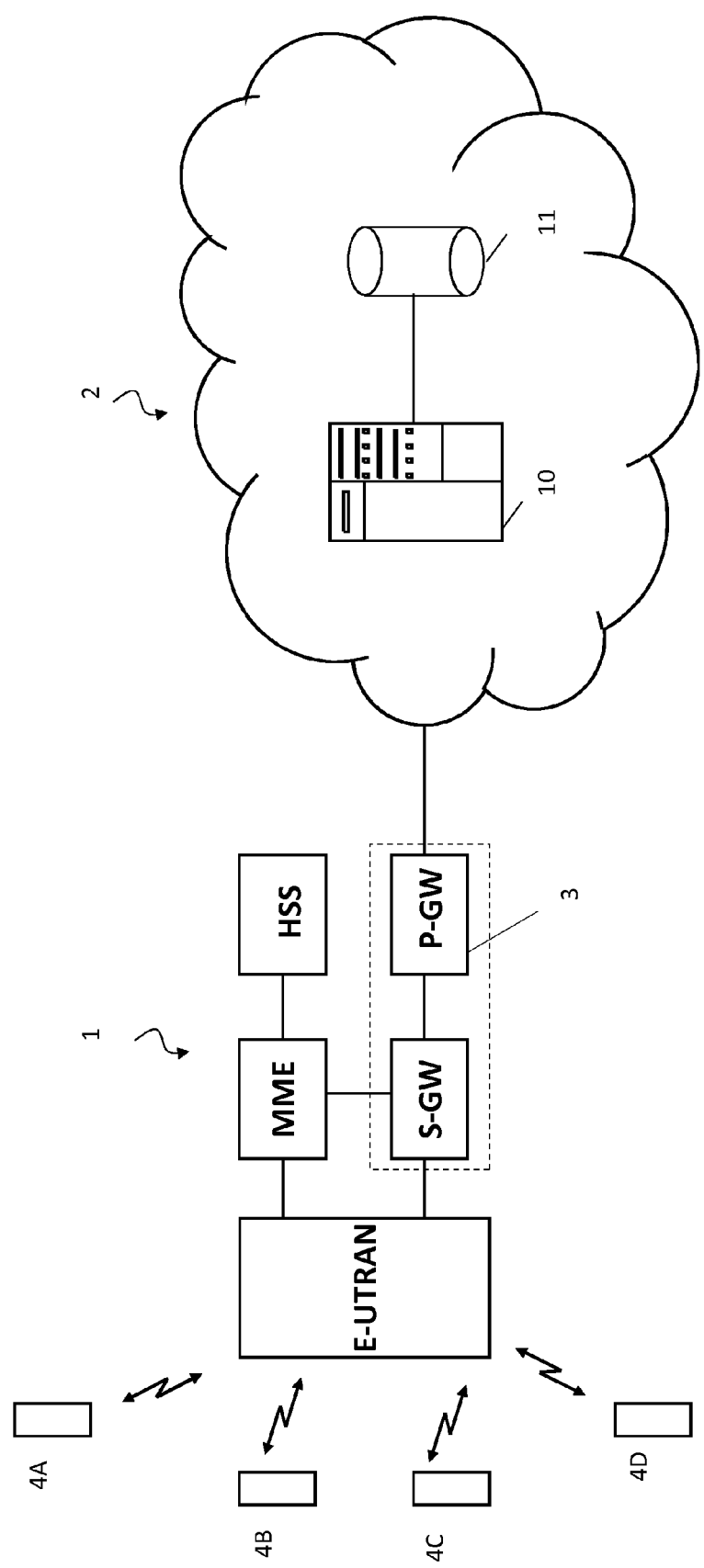
FIG. 1 is a schematic illustration of a group of UPnP devices connected via a 4G LTE telecommunications network to a discovery server system.

FIG. 1 is a schematic illustration of a wide area network 1 (a telecommunications network) connected to a network 2, such as the internet or an operator-wide IP addressing domain, via a gateway 3. In FIG. 1, the telecommunications network 1 comprises an LTE or 4G access network and the gateway is commonly referred to as Packet Gateway (P-GW). In the disclosed embodiment of FIG. 1, four devices 4A-4D are illustrated that are connected to the telecommunications network 1. It should be appreciated that in practice more devices are attached or connected to the telecommunications network 1.

It should also be appreciated that, whereas FIG. 1 depicts a wireless access WAN network 1, non-cellular WAN networks may also be used. Such WAN networks may have a similar architecture. E.g. also in DSL networks, there is an identifiable gateway 3. Between the device 4A-4D and the gateway 3, a tunneling connection may be formed. After the gateway 3, generally IP addressing is used on the network 2.

The telecommunications network 1 is an exemplary network, commonly indicated as Long Term Evolution (LTE) or Evolved Packet System (EPS). Such a network comprises a Packet Gateway (P-GW) and a Serving Gateway (S-GW). The E-UTRAN of the EPS comprises evolved NodeBs (eNodeBs or eNBs) providing wireless access for a device 2 that is connected to the S-GW via a packet network. The S-GW is connected to a Home Subscriber Server HSS via a Mobility Management Entity MME for signalling purposes. The HSS may include a subscription profile repository SPR containing subscription information of user device 1.

Further information of the general architecture of a EPS network can be found in 3GPP TS 23.401.

In the disclosed embodiment of FIG. 1, the network 2 contains a discovery server system 10. The discovery server system 10 has access to a database 11. Other forms of access to storage are also possible. A more detailed embodiment of the discovery server system 10 and the database 11 are described with reference to FIGS. 2 and 3A.

Figure 2:
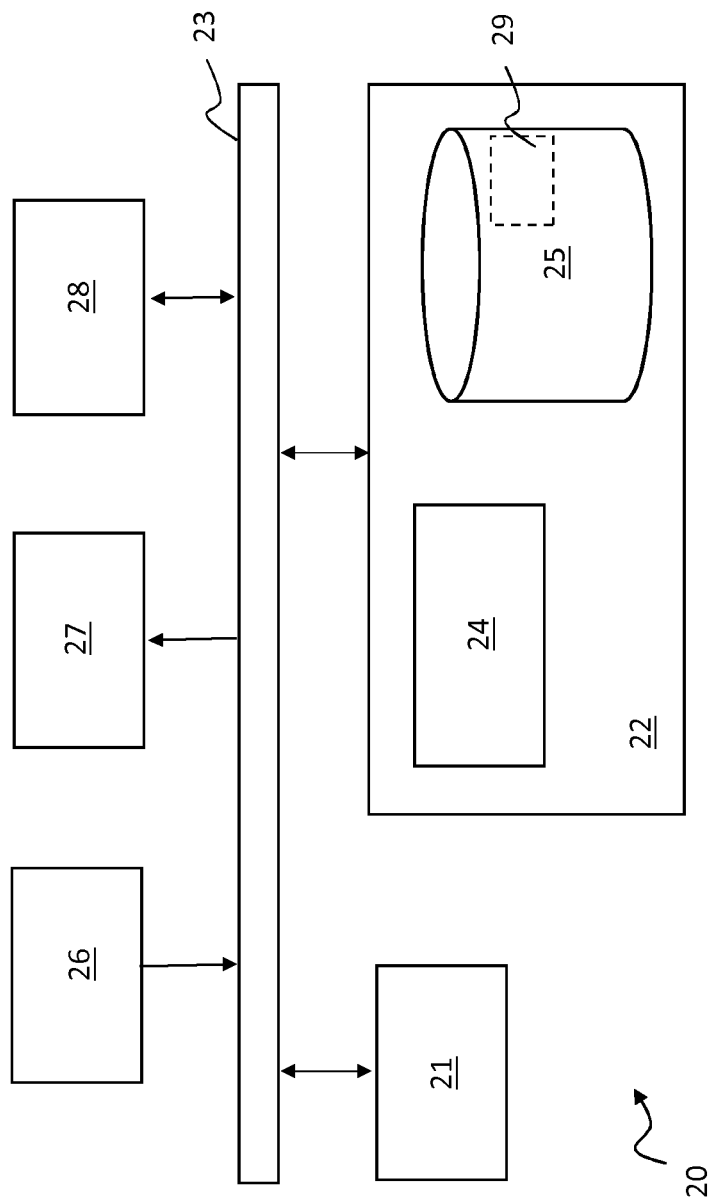
FIG. 2 is a schematic block diagram of a general device, server system or network architecture.

FIG. 2 is a block diagram illustrating an exemplary data processing system that may be used as a device 4A-4B or as a server, such as discovery server system 10. The same architecture may also relate to the network entity 3.

Data processing system 20 may include at least one processor 21 coupled to memory elements 22 through a system bus 23. As such, the data processing system may store program code within memory elements 22. Further, processor 21 may execute the program code accessed from memory elements 22 via system bus 23. In one aspect, data processing system 20 may be implemented as a computer that is suitable for storing and/or executing program code. It should be appreciated, however, that data processing system 20 may be implemented in the form of any system including a processor and memory that is capable of performing the functions described within this specification.

Memory elements 22 may include one or more physical memory devices such as, for example, local memory 24 and one or more bulk storage devices 25. Local memory may refer to random access memory or other non-persistent memory device(s) generally used during actual execution of the program code. A bulk storage device may be implemented as a hard drive or other persistent data storage device. The data processing system 20 may also include one or more cache memories (not shown) that provide temporary storage of at least some program code in order to reduce the number of times program code must be retrieved from bulk storage device 25 during execution.

Input/output (I/O) devices depicted as input device 26 and output device 27 optionally can be coupled to the data processing system 20. Examples of input devices may include, but are not limited to, for example, a keyboard, a pointing device such as a mouse, a touchscreen, or the like. Examples of output device may include, but are not limited to, for example, a monitor or display, speakers, or the like. Input device 26 and/or output device 27 may be coupled to data processing system 20 either directly or through intervening I/O controllers. A network adapter 28 may also be coupled to data processing system 20 to enable it to become coupled to other systems, computer systems, remote network devices, and/or remote storage devices through intervening private or public networks. The network adapter 28 may comprise a data receiver for receiving data that is transmitted by said systems, devices and/or networks to said data processing system 20 and a data transmitter for transmitting data to said systems, devices and/or networks. Modems, cable modems, and Ethernet cards are examples of different types of network adapters that may be used with data processing system 20.

As pictured in FIG. 2, memory elements 22 may store an application 29. It should be appreciated that data processing system 20 may further execute an operating system (not shown) that can facilitate execution of the application. Applications, being implemented in the form of executable program code, can be executed by data processing system 20, e.g., by processor 21. Responsive to executing the application 29, the data processing system 20 may be configured to perform one or more operations to be described herein in further detail.

In one aspect, for example, data processing system 20 may represent a client data processing system, e.g. within user devices 4A-4D. In that case, application 29 may represent a client application that, when executed, configures data processing system 20 to perform the various functions described herein with reference to a "client" or device. Examples of a client can include, but are not limited to, a personal computer, a portable computer, a mobile phone, or the like.

In another aspect, data processing system 20 may represent a server or server system, such as the discovery server system 10 depicted in FIG. 1, in which case application 29, when executed, may configure data processing system 20 to perform operations as described in the present disclosure. In another aspect, data processing system 20 may represent a network entity, for example a P-GW as described in greater detail within this specification with reference to FIG. 3B.

The application 29 in FIG. 2 may comprise a UPnP application enabling at least one of discovery, control and eventing.

Figure 3A:
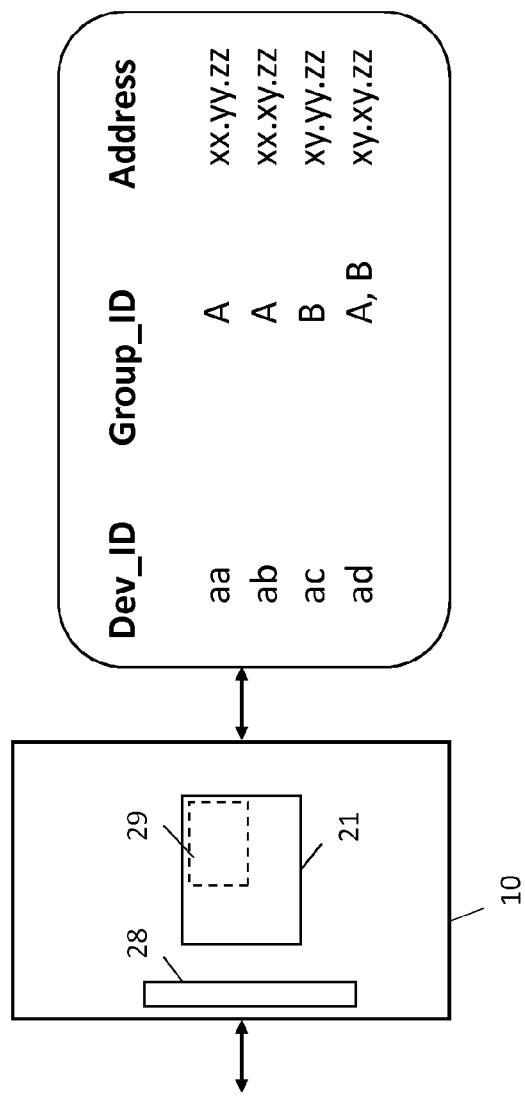
FIGS. 3A and 3B are schematic illustrations of the discovery server system and a network entity, respectively.
Figure 3B:
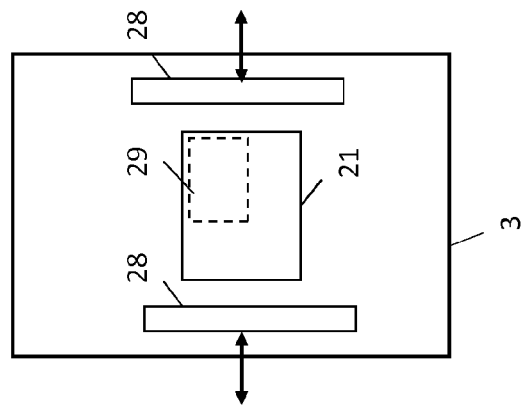

FIGS. 3A and 3B are schematic illustrations of the discovery server system 10 and a network entity in the telecommunications network 1, respectively. It should be noted that, while in the subsequent disclosed embodiments a group identifier is applied for determination of a group to which a device belongs, other means have been envisaged as described in the summary (implicit group information).

FIG. 3A shows a discovery server system 10 having access to device identifiers, group identifiers and destination addresses of devices as shown. This information may be contained in a database 11 as shown in FIG. 1. The discovery server system 10 may comprise one or more servers. The discovery server system 10 comprises at least one processor circuitry programmed to perform the disclosed method. Examples of such methods will be described below with reference to FIGS. 4A-4B and FIGS. 5A-5B.

Some elements of the discovery server system 10 have been discussed with reference to FIG. 2 and are depicted again in FIG. 3A. In FIG. 3A, application 29 has been loaded into the processor 21 for performing the disclosed method. Database 11 may either be integrated within the discovery server system 10 (e.g. as one of the memory elements 22) or be provided from a distance.

Various information elements are stored in the entries of the database 11 that are advantageous in performing the method disclosed herein. Access to the database 11 can be provided in several ways, including web access by e.g. a group manager of a group of devices.

In the first column of the database 11, an individual device identifier Dev_ID "aa" for device 4A, "ab" for device 4B, "ac" for device 4C and "ad" for device 4D is stored for each of the devices 4A-4D. Examples of such device identifiers include the IMSI stored on a SIM card of the devices. Alternatively, the device identifier Dev_ID comprises a UPnP UUID. The device identifier Dev_ID is preferably tied to a mobile subscription. The device identifier Dev_ID may be either provisioned from the telecommunications network 1 or be stored in the device and transmitted to the telecommunications network 1. The device identifier Dev_ID may be a non-public identifier to avoid that identifiers can be abused and devices can illegally be made part of a group A or B.

The device identifiers Dev_ID corresponding to the devices of the groups A, B of devices 4A-4D may be assigned to the devices in various manners. In one embodiment, the device identifier may be stored in the device, e.g. on a SIM or USIM card. The device identifier Dev_ID may then be included in the discovery message. The telecommunications network 1, however, may also play a part in having a device identifier Dev_ID correspond to a device. In one embodiment, the device identifier Dev_ID is transmitted to a device 4A-4D from the network 1 for inclusion in the discovery message. The device identifier may be retrieved from the discovery server system 10. Registration of a new device in the database 11 may trigger transmission of a device identifier to the device 4A-4D, e.g. using OMA device management. When a device 4A-4D registers for the first time to the network 1, the network 1 can provide all kinds of data and parameters related to the subscription and may thus include an identifier for the discovery message, e.g. on the first attach for a new subscription or after a software/capability update or upgrade. In another embodiment, the network 1 itself may include the device identifier Dev_ID in the discovery message. The network 1 may perform network assertion, i.e. the network (entity) blocks incorrect device identifiers and replaces these with correct identifiers Dev_ID.

Specific embodiments for e.g. UPnP include the following. Note that control protocols other than UPnP, e.g. Bonjour/Airplay, may be used and/or adapted according to the following.

All UPnP devices 4A-4D have a unique identifier UUID, a string according to RFC2141 and UPnP Device Architecture 1.1. The requirements are a string mapping down to a 128-bit number (e.g. MAC and time based). It is very unlikely to duplicate a UUID from some other resource. A UUID remains fixed over time.

The device identifier Dev_ID is proposed to be part of the group and on the basis of the device identifier Dev_ID, the discovery server system 10 knows in which group(s) the device 4A-4D belongs. Therefore, it is advantageous that the device identifier Dev_ID is tied to the mobile subscription and that it is difficult to misuse somebody else's device identifier.

There are different embodiments how to achieve this.

In a first embodiment, the device identifier Dev_ID may be provisioned to the device 4A-4D by the network 1, e.g. via OMA Device Management. When a device 4A-4D registers for the first time to the telecommunications network 1, the network can provide all kinds of data and parameters related to the subscription. A device identifier Dev_ID for use with UPnP may be part of that. The device identifier Dev_ID that is provided this way should ideally not be visible on the device 4A-4D as it then may be copied and used on another device. If the device identifier Dev_ID is sufficiently long (and because there is little incentive to give the device identifier Dev_ID to others) this protection may be sufficient.

Another embodiment comprises that the device 4A-4D uses information/identifiers stored on the SIM card. Again, the information is provided under control of the operator of the telecommunications network 1, but the data might be copied and misused on another device if made public. A UICC based identifier that could be used is the IMSI, as this identifier is in general not made public.

In yet another embodiment, the telecommunications network asserts that the device identifier Dev_ID is indeed correct when the device identifier Dev_ID is sent in a UPnP discovery message to the discovery server system 10. Network assertion could imply that incorrect device identifier Dev_IDs are blocked, that incorrect device identifier Dev_IDs are replaced with the correct device identifier Dev_IDs, or that the UE does not provide a device identifier Dev_ID itself and that the network fills in this parameter. As the device identifier Dev_ID may be inserted in UPnP messages within the user data stream, the network entity 3 could use deep packet inspection to find the UPnP messages and the device identifier Dev_IDs within these UPnP messages and check/correct/insert the device identifier Dev_ID.

Returning now to FIG. 3A, each of the devices 4A-4D is associated with a group identifier as illustrated in the second column of the database 11. Devices 4A, 4B and 4D are members of a group identified by group identifier Group_ID "A". Device 4C is a member of a group identified by Group_ID "B". Device 4D is also a member of the group identified by Group_ID "B". The third column of the database is filled with current IP addresses for each of the devices 4A-4D connected to the telecommunications network 1 and mapped to the device identifiers.

IP addresses may be allocated dynamically (e.g. because of shortage of IP addresses, e.g. if the IP addresses are IPv4 addresses) or permanently to devices (which may be the case for IPv6 addresses). In the former case, a refresh of the address of a device 4A-4D is advantageously registered by the discovery server system 10. In such an embodiment, an address notification message may be received from a device 4A-4D of the group of devices containing the corresponding device identifier Dev_ID of the device. The address of the device from which the address notification message has been received may then be determined and stored as the destination address of the device corresponding to the device identifier.

FIG. 3B is a schematic illustration of a network entity 3 in the telecommunications network 1. The network entity 3 may e.g. comprise a P-GW. The telecommunications network 1 is configured for delivering a discovery message of a device 4A-4D to the discovery server system 10, even if the discovery message is transmitted using a multicast address, such as a standardized UPnP multicast address.

The network entity of FIG. 3B comprises circuitry programmed to ensure that the discovery message is delivered substantially only to the distributed server system 1. Some of the components or modules described with reference to FIG. 2 are also depicted in FIG. 3B, wherein the application 29 is shown to be loaded into processor 21 to perform the following operation. Application 29 receives the discovery message from a device 4A-4D that is addressed to a UPnP multicast address. Application 29 ensures that the discovery message is only directed to the discovery server system 10. For example, the discovery message may be received in relation to a particular Application Point Name (APN) and the network entity 3 has a dedicated interface 28, associated with the APN, for transmitting the discovery message to the discovery server system 10. In another example, the application 29 in the network entity 3 is configured for replacing the multicast UPnP address with a unicast address of the discovery server system 10.

In more detail, there are different embodiments how to ensure that IP traffic from the devices 4A-4d reaches the discovery server system 10. When the device 4A-4D is connected to a telecommunications network 1, there is a layer 2 link between the device 4A-4D and the P-GW 3. All traffic sent over the radio interface ends up at the P-GW. However, behind the P-GW, there normally is an IP domain where all kinds of destinations are possible.

In UPnP, the device 4A-4D uses a multicast IP address. The P-GW facilitates that on the IP domain between the P-GW and the discovery server system 10, the IP packets with the broadcast IP address are not broadcast to all IP nodes on the IP domain, but only sent to the discover server system.

In a first embodiment, a dedicated APN (destination address for the EPS Bearer/PDP Context) is used for UPnP. With the dedicated APN, a specific outgoing interface on a specific P-GW can be selected. Only the discovery server system 10 is connected to this specific outgoing interface, either via a specific direct link or via a specific VPN that connects to the Server. Because of the direct link, there is no layer 3 IP based routing on the interface between the P-GW and the distributed server system 10.

In a second embodiment, deep packet inspection in the P-GW is used to replace the multicast IP address with an IP address of the discovery server system 10. Now the routing from the P-GW to the discovery server system 10 can take place via a normal IP domain.

In a third embodiment, the device 4A-4D replaces the multicast address with an IP address of the server, e.g. because it is aware that it is connected to a cellular network 1 or because it is permanently adapted to do so. The device 4A-4D may obtain this IP address e.g. via DHCP.

Figure 4B:
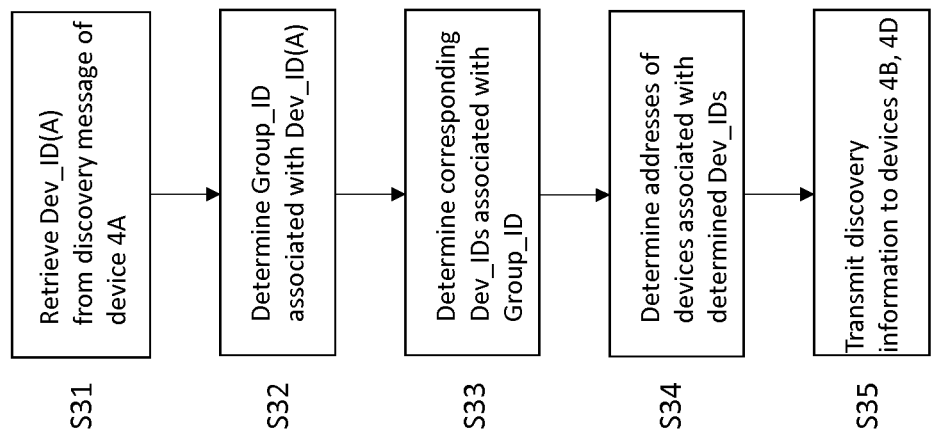
FIGS. 4A and 4B are a time diagram and a flow chart, respectively, illustrating an advertising action over a wide area network in a discovery server system.
Figure 4A:
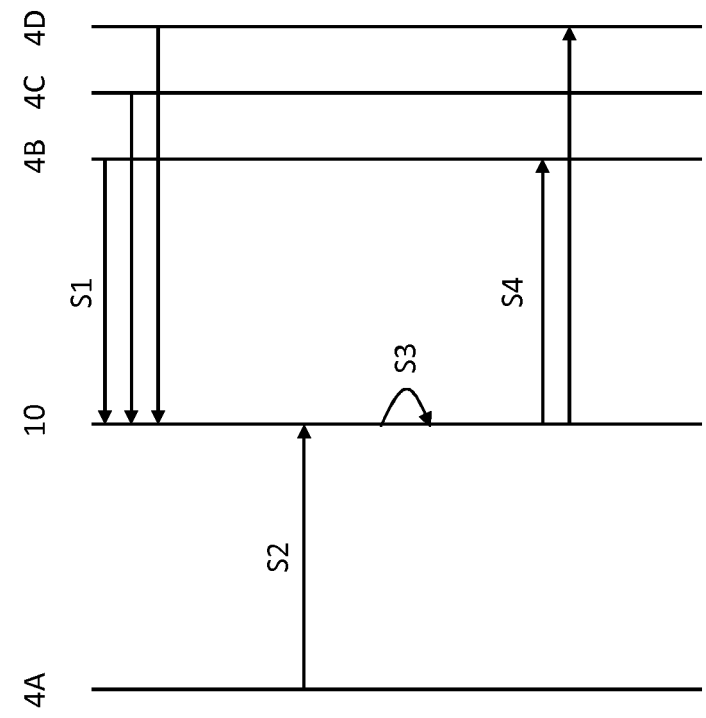

FIGS. 4A and 4B are a time diagram and a flow chart, respectively, illustrating an advertising action over a wide area network in a discovery server system. In the time diagram of FIG. 4A, the network entity 3 has been omitted. It is assumed that the network entity 3, e.g. a P-GW, receives the relevant data and messages from the devices 4A-4D and directs the information only to the discovery server system 10. In one embodiment, this may be achieved by configuring a tunnel between the devices 4A-4D and the network entity 3 (the devices log in to use the tunnel) and (one of) the mechanisms described with reference to FIG. 3B.

UPnP may be configured on devices 4A-4D and UPnP services and control points may be running on devices 4A-4D. Whereas other protocols may be used, it is assumed in the embodiments that UPnP is used.

In step S1, devices 4B, 4C and 4D inform the discovery server system 10 of their presence. When attaching or connecting to the telecommunications network 1, devices 4B-4D register themselves at the discovery server system 10 by sending any message, e.g. a UPnP message. These messages contain the device identifiers Dev_ID of the corresponding devices 4B-4D (i.e. "ab", "ac" and "ad", respectively) and the current IP addresses. The discovery server system 10 stores the mapping between the device identifier Dev_ID and the IP address as shown in FIG. 3A.

In step S2, device 4A multicasts a UPnP message to the standardized UPnP multicast address 239.255.255.250: 1900. The UPnP message is a discovery message advertising the presence of device 4A. The device identifier Dev_ID is added as an information field to the discovery message, here "aa", to the discovery server system 10.

After receiving the discovery message at the P-GW and forwarding the message to the discovery server system 10, the distribution server system 10 receives and processes the discovery message in step S3. Step S3 is described in further detail with reference to FIG. 4B.

In step S31, the discovery server system 10 extracts the device identifier Dev_ID="aa" from the discovery message of device 4A. The device identifier is then used as key to trace the group identifier Group_ID of device 4A in step S32. After having determined Group_ID="A", corresponding device identifiers Dev_ID associated with Group_ID="A" are identified in step S33. From the database 11 in FIG. 3A, it follows that the identifiers associated with Group_ID="A" are "ab" and "ad". Then, in step S34, the addresses (e.g. IP addresses) are determined that are listed in the database for the identified corresponding device identifier Dev_ID. In step S35, the discovery information contained in the discovery message of device 4A is relayed to devices 4B and 4D (listed at the discovery server system 10 as belonging to the same group "A" as device 4A).

In step S4, the discovery information of device 4A is received by devices 4B and 4D. Device 4C, belonging to a different group, does not receive the discovery information.

Figure 5B:
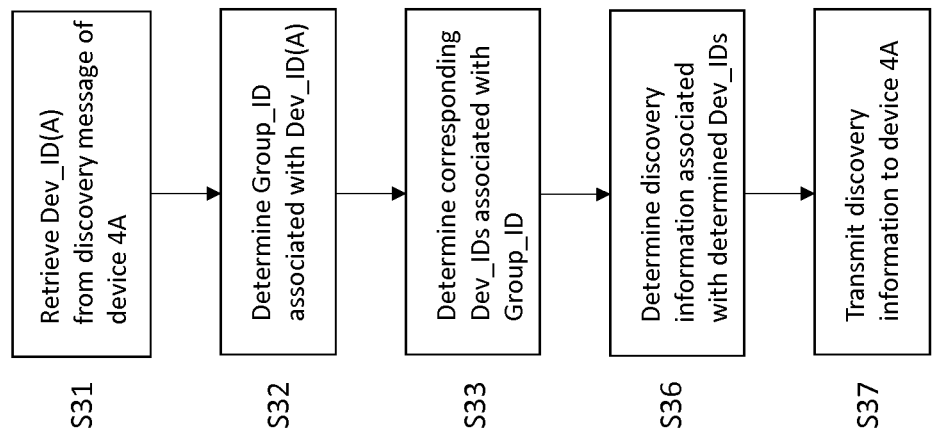
FIGS. 5A and 5B are a time diagram and a flow chart, respectively, illustrating a search action over a wide area network in a discovery server system.
Figure 5A:
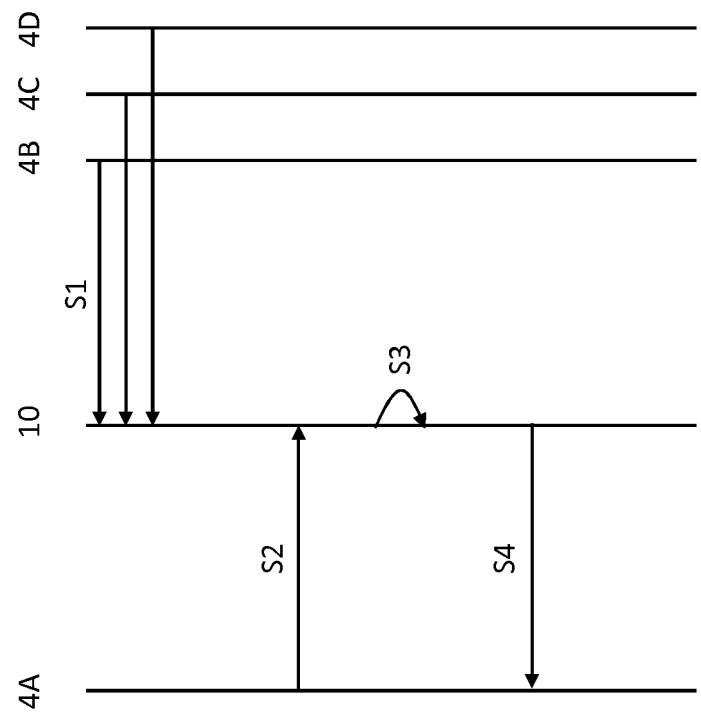

FIGS. 5A and 5B are a time diagram and a flow chart, respectively, illustrating a search action over a wide area network in a discovery server system 10. Again, in the time diagram of FIG. 5A, the network entity 3 has been omitted. It is assumed that the network entity 3, e.g. a P-GW, receives the relevant data and messages from the devices 4A-4D and directs the information only to the discovery server system 10. In one embodiment, this may be achieved by configuring a tunnel between the devices 4A-4D and the network entity 3 (the devices log in to use the tunnel) and (one of) the mechanisms described with reference to FIG. 3B.

UPnP may be configured on devices 4A-4D and UPnP services and control points may be running on devices 4A-4D. Whereas other protocols may be used, it is assumed in the embodiments that UPnP is used. It is assumed that in the embodiment of FIGS. 5A-5B, the discovery server system 10 runs a UPnP control point.

In particular, like the embodiment of FIGS. 4A-4B, the embodiment of FIGS. 5A-5B is also based on a distribution server system 10 in between the peer-to-peer (to be) connected devices 4A-4D. However, in the embodiment of FIGS. 5A-5B, the discovery server system 10 contains a UPnP Control Point application. The Control Point application will store UPnP information from devices 4A-4D and can also provide information about specific UPnP devices to other UPnP devices 4A-4D. In the embodiment of FIGS. 5A-5B, the discovery server system 10 stores discovery information of devices 4A-4D in association with a group identifier Group_ID. The Control Point will only provide discovery information in response to a discovery message of a device contained in the same group. Accordingly, network resources may be saved.

In step S1 of FIG. 5A, devices 4B, 4C and 4D transmit UPnP data to the discovery server system 10 using a multicast address, such as the standard UPnP multicast address 239.255.255.250:1900. When attaching or connecting to the telecommunications network, devices 4B-4D register themselves at the discovery server system 10 by sending any message, e.g. a UPnP message. These messages contain the device identifiers Dev_ID of the corresponding devices 4B-4D (i.e. "ab", "ac" and "ad", respectively). The discovery server system 10 stores the UPnP data and maps the stored UPnP data with the device identifier Dev_ID from which the UPnP data originates.

In step S2, device 4A multicasts a UPnP message to the standardized UPnP multicast address 239.255.255.250:1900. The UPnP message is a discovery message requesting UPnP data from the CP application run by the discovery server system 10. The device identifier Dev_ID is added as an information field to the discovery message, here "aa", to the discovery server system 10.

After receiving the discovery message at the P-GW and forwarding the message to the discovery server system 10, the distribution server system 10 receives and processes the discovery message in step S3. Step S3 is described in further detail with reference to FIG. 4B.

In step S31, the discovery server system 10 extracts the device identifier Dev_ID="aa" from the discovery message of device 4A. The device identifier is then used as key to trace the group identifier Group_ID of device 4A in step S32. After having determined Group_ID="A", corresponding device identifiers Dev_ID associated with Group_ID="A" are identified in step S33. From the database 11 in FIG. 3A, it follows that the identifiers associated with Group_ID="A" are "ab" and "ad".

Then, in step S36, the discovery information associated with other devices 4B, 4D associated with the determined group identifier Group_ID="A" is determined and collected for transmission back to device 4A in step S37.

In step S4, the discovery information of devices 4B, 4D is received by device 4A. Discovery information of device 4C is not received by device 4A since device 4C is associated with a different group.

Devices may not always be available for providing services or as control points. A termination notification message may be received by the discovery server system 10 (either generated by the device or within the network after detecting some event, such as detach) and the discovery server system 10 may update the group information accordingly. The termination notification message may contain the device identifier Dev_ID of the device and the device identifier may then be omitted from the group associated with the group identifier or the device identifier may be given a "non-available" status. The discovery information is then no longer transmitted to the device associated with the device identifier. A termination notification message may also relate to one group that should be eliminated from the list for a particular device, whereas the device remains being listed in the database 11 for another group.

There will be scenarios where different devices within one group have subscriptions belonging to different operators and access the network via different operators.

In an embodiment, there is only one operator that operates the discovery server system for a particular group. Within the particular group, there can be devices from different operators. The responsibility to ensure that the device identifier Dev_ID can be trusted may be with the other operator(s). Different operators may have different operator domains.

Figure 6:
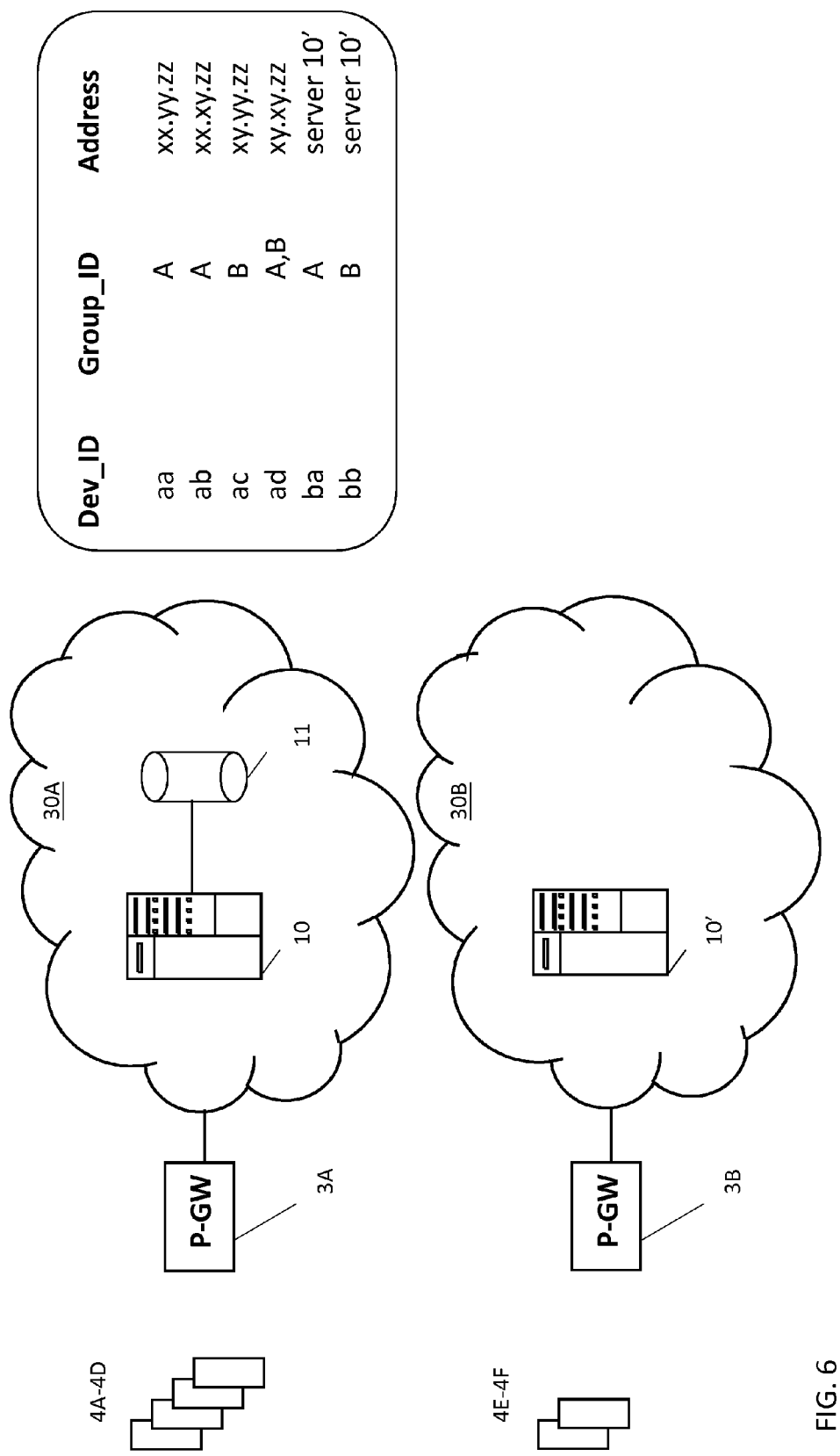
FIG. 6 is a schematic illustration of two groups of devices associated with different operator domains.

FIG. 6 is an embodiment of a multi-operator system comprising a first operator domain 30A associated with a first operator A and a second operator domain 30B associated with a second operator B. The first operator operates a first gateway 3A. A second operator B operates a second gateway 3B.

In the embodiment of FIG. 6, the discovery server system 10 contains information about the devices associated with device identifiers Dev_ID="aa", "ab", "ad" and "ba" contained in the group identified by group identifier Group_ID="A" and the devices associated with device identifiers Dev_ID="ac", "ad" and "bb". The information is stored in the database 11 accessible to the discovery server system 10.

As can be observed from FIG. 6, the difference in operator domain may be signalled from the device identifier Dev_ID. In one embodiment, at least a portion of the device identifier Dev_ID is indicative of the operator domain of a device 4A-4F. In the embodiment shown, the first part of the device identifier is indicative of the operator domain (e.g. the different operator). Devices 4A-4D are associated with the first operator A and have a designation "a" at a predetermined position in the device identifier. Devices 4E-4F are associated with the second operator B, which is signalled by the designation "b" at a predetermined position in the device identifier.

Whereas the group identifier determination step and device identifier determination step S32, S33 are performed in the domain 30A containing the discovery server system 10, the determination of the destination address is left to the server system 10' of the operator B signalled by the first part of the device identifier. For example, a discovery message from device 4A advertising its presence (see FIGS. 4A and 4B) may be transmitted to device 4E identified by device identifier "ba" as follows. The discovery server 10 receives the discovery message, determines that the discovery information should be relayed to devices associated with group identifier Group_ID="A". The discovery server system 10 determines the device identifiers Dev_ID having this group identifier. From the determined device identifiers, the discovery server system is signalled by the first part of the device identifier whether the device has a destination address in the domain of operator A or in a different domain B. For the device 4E in the domain of operator B, the database has an address of the server 10'. The discovery information is forwarded to this server 10' and it is left to server 10' to determine the destination address (e.g. qq.rr.ss) of the device associated with device identifier "ba".

Whereas the previous disclosure primarily relates to UPnP discovery (advertising and search), it should be noted that other aspects of UPnP may also advantageously apply to the discovery server system 10. The aspects include UPnP control and UPnP eventing.

As mentioned previously in relation with FIGS. 5A and 5B, the discovery server system 10 may store UPnP information from devices. As the discovery server system runs a Control Point application, it may subsequently control services provided from these devices. The control may be programmed via an external web interface to the discovery server system 10 (which may be the same interface as for managing the grouping of devices).

Control with UPnP means that a Control Point application is able to control a UPnP service application. In an embodiment, the discovery server system 10 comprises a Control Point and a UPnP service is provided on a device 4B-4D. The Control Point is able to remotely control a UPnP service located on the device 4B-4D. Control can only start when it is known which UPnP service must be controlled, which may be contained in the discovery information. The UPnP service to be addressed is implemented according to the UPnP standard with a webserver. The Control Point receives an advertisement: HTTP Notify with Location or HTTP 200 OK with Location, and the Location field contains a URL for UPnP description for the device e.g. http://139.153.254.43:4004/description.xml. The control point sends an HTPP GET message with URL for the desired service and receives an HTTP 200 OK response message with XML-file device-description.xml containing amongst other a 'URL to service description', a 'URL for control' and a 'URL for eventing'. The Control Point sends an HTPP GET message with URL for the 'URL to service description' and receives an HTTP 200 OK response message with XML-file service-description containing commands for actions like control and for requesting state variables. Requesting actions and answering in UPnP occurs with SOAP messages over HTTP using the commands as specified in service-description.xml which may thus originate from the discovery server system 10.

Figure 7:
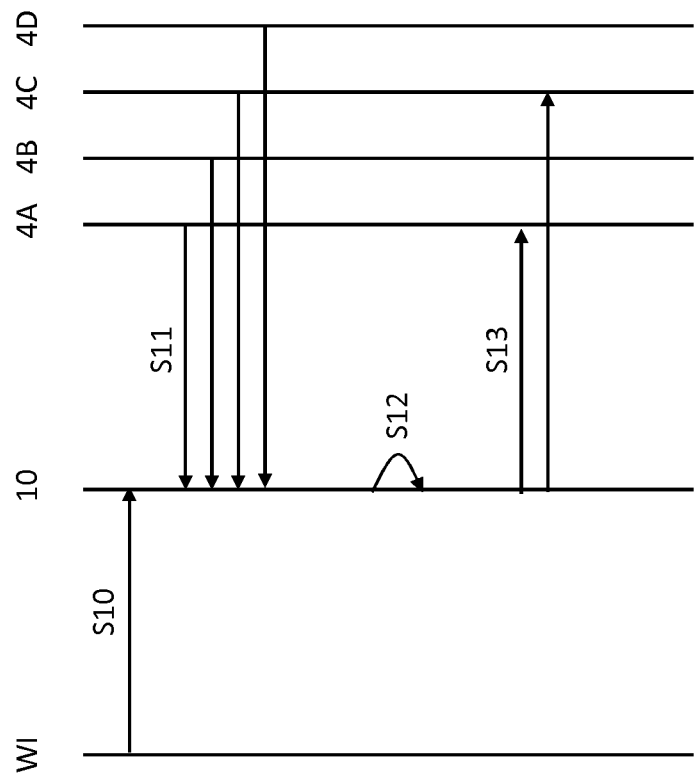
FIG. 7 is a time diagram illustrating a control action performed from a server system.

FIG. 7 is an illustration of a control action performed by a Control Point application on the discovery server system 10. In a first step S10, a manager of a group A may program particular control instructions via an external web interface WI for a group of devices 4A-4D associated with group A. In step S11, UPnP service information (discovery information) is received from devices 4A-4D. The discovery information associated with devices of group identifier Group_ID="A" is determined in step 12 in a manner similar as described for the advertising in relation with FIGS. 4A and 4B and searching in relation with FIGS. 5A and 5B. Control actions are performed in step S13 for some of the devices, here 4A and 4C (e.g. the UPnP information received from device 4D may not have allowed a control action from the Control Point application in the discovery server system 10).

In UPnP, eventing occurs by using the General Event Notification Architecture (GENA) protocol and the CP can subscribe or unsubscribe on notifications for device availability or state variable changes. The CP listens to HTPP Notification messages. An initial event notification takes place when a subscriber subscribes. Eventing in UPnP can be unicast or multicast. For multicast the same mechanisms as used in the Discovery part of this document, can be used.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A method for discovery of one or more devices of a group of devices to establish a direct connection between at least two devices of the group of devices over a wide area network, the wide area network containing or being connected to a discovery server system, the discovery server system being configured for determining a group associated with the group of devices, wherein each of the devices has a corresponding device identifier associated with the group, the method being carried out in the discovery server system and comprising:
   receiving a discovery message from a first device of the group of devices, the discovery message comprising a device identifier associated with the first device;
   determining the group associated with the group of devices on the basis of the received device identifier of the first device;
   determining the corresponding device identifier of one or more devices of the group of devices on the basis of the determined group; and
   transmitting discovery information only to one or more devices of the group of devices.

2. The method according to claim 1, wherein the discovery message from the first device contains discovery information, and wherein the method further comprises transmitting the discovery information only to each of the one or more devices of the group of devices for which a corresponding device identifier has been determined.

3. The method according to claim 1, further comprising:
   receiving and storing the discovery information from one or more devices in association with the device identifiers of the one or more devices of the group of devices;
   determining, on the basis of the device identifier of the first device, the stored discovery information associated with the device identifiers of the one or more devices of the group of devices; and
   transmitting the determined discovery information of the one or more devices to the first device.

4. The method according to claim 1, further comprising:
   determining a corresponding destination address for each of the one or more devices associated with the determined corresponding device identifiers; and
   transmitting the discovery information only to the one or more devices using the determined one or more corresponding destination addresses.

5. The method according to claim 4, further comprising:
   receiving an address notification message from a device of the group of devices containing the corresponding device identifier of the device;
   determining an address of the device from which the address notification message is received; and
   storing the determined address as the destination address of the device corresponding to the device identifier.

6. The method according to claim 4, wherein at least one device of the group of devices has a destination address in an operator domain different from the operator domain of the first device, wherein at least a portion of the device identifier is indicative of the different operator domain of the at least one device, and wherein the method further comprises exchanging the discovery information for the device with a server associated with the operator domain indicated by the portion of the device identifier.

7. The method according to claim 1, further comprising:
   receiving a termination notification message from a device of the group of devices, the termination notification message containing the device identifier of the device; and
   omitting transmitting the discovery information to the device identified by the device identifier contained in the termination notification message.

8. The method according to claim 1, wherein the device identifiers are each one of a UPnP UUID or an IMSI.

9. A discovery server system for enabling discovery of one or more devices of a group of devices to establish a direct connection between at least two devices of the group of devices over a wide area network, wherein the discovery server system is configured for being contained in or connected to the wide area network, and wherein the discovery server system comprises:
   one or more processors and memory storing instructions that when executed by the one or more processors cause the discovery system to carry out operations including:
   receiving a discovery message from a first device of the group of devices, the discovery message comprising a device identifier associated with the first device;
   determining a group associated with the group of devices, wherein each of the devices has a corresponding device identifier associated with the group, on the basis of the received device identifier of the first device;
   determining the corresponding device identifiers of the one or more devices of the group of devices on the basis of the determined group; and
   transmitting discovery information only to one or more devices of the group of devices.

10. The discovery server system according to claim 9, wherein the discovery message from the first device contains discovery information, and wherein the operations further include transmitting the discovery information only to each of the one or more devices of the group of devices for which a corresponding device identifier has been determined.

11. The discovery server system according to claim 9, wherein the discovery server system is further configured for being accessible via a web interface for an operation, the operation being at least one of managing groups of devices or determining control actions for one or more devices in a group of devices.

12. A telecommunications network configured for enabling establishment of a direct connection between at least two devices of a group of one or more devices,
   wherein the telecommunications network contains or is connected to a discovery server system, wherein the discovery server system is configured for determining a group associated with the group of devices, wherein the discovery server system is further configured for:

receiving a discovery message from a first device of the group of devices, the discovery message comprising a device identifier associated with the first device;

determining a group associated with the group of devices, wherein each of the devices has a corresponding device identifier associated with the group, on the basis of the received device identifier of the first device;

determining the corresponding device identifiers of the one or more devices of the group of devices on the basis of the determined group; and transmitting discovery information only to one or more devices of the group of devices, and wherein the telecommunications network is further configured for delivering the discovery message of the first device to the discovery server system.

13. The telecommunications network according to claim 12 further comprising a network entity for use in combination with the discovery server system, the network entity comprising:

a receiver configured for receiving the discovery message from the first device, the discovery message being addressed to a multicast address; and a processor and memory storing instructions that when executed by the processor cause the processor to carry out operations including directing the discovery message only to the discovery server system.

14. The telecommunications network according to claim 13, wherein the discovery message is received in relation to a particular Application Point Name (APN) and the network entity has a dedicated interface, associated with the APN, for transmitting the discovery message to the discovery server system.

15. The telecommunications network according to claim 13, wherein the operations further include replacing the multicast UPnP address with a unicast address of the discovery server system.

16. The telecommunications network according to claim 12, wherein the telecommunications network is further configured for carrying out a communication operation, the communication operation being one of:

transmitting the device identifier to the first device for inclusion in the discovery message; or receiving the discovery message from the first device and including the device identifier in the discovery message.

17. The discovery server system according to claim 9, wherein the operations further include:

receiving and storing the discovery information from one or more devices in association with the device identifiers of the one or more devices of the group of devices;

determining, on the basis of the device identifier of the first device, the stored discovery information associated with the device identifiers of the one or more devices of the group of devices; and transmitting the determined discovery information of the one or more devices to the first device.

18. The discovery server system according to claim 9, wherein the operations further include:

determining a corresponding destination address for each of the one or more devices associated with the determined corresponding device identifiers; and transmitting the discovery information only to the one or more devices using the determined one or more corresponding destination addresses.

19. The discovery server system according to claim 9, wherein the operations further include:

receiving an address notification message from a device of the group of devices containing the corresponding device identifier of the device;

determining an address of the device from which the address notification message is received; and storing the determined address as the destination address of the device corresponding to the device identifier.

20. The discovery server system according to claim 9, wherein at least one device of the group of devices has a destination address in an operator domain different from the operator domain of the first device, wherein at least a portion of the device identifier is indicative of the different operator domain of the at least one device, and wherein the operations further include exchanging the discovery information for the device with a server associated with the operator domain indicated by the portion of the device identifier.

21. The discovery server system according to claim 9, wherein the operations further include:

receiving a termination notification message from a device of the group of devices, the termination notification message containing the device identifier of the device; and omitting transmitting the discovery information to the device identified by the device identifier contained in the termination notification message.

22. The discovery server system according to claim 9, wherein the device identifiers are each one of a UPnP UUID or an IMSI.

* * * * *